United States Patent
Guillou et al.

(10) Patent No.: US 9,323,583 B2
(45) Date of Patent: Apr. 26, 2016

(54) METHOD FOR ALLOWING DISTRIBUTED RUNNING OF AN APPLICATION AND RELATED DEVICE AND INFERENCE ENGINE

(75) Inventors: Aurélien Guillou, Perros Guirec (FR); Hernit Bhatia, London (GB); Elise Vennegues, Sainte-Agnès (FR); Nishantha Pelendage, London (GB)

(73) Assignee: FRANCE TELECOM, Paris (FR)

( * ) Notice: Subject to any disclaimer, the term of this patent is extended or adjusted under 35 U.S.C. 154(b) by 337 days.

(21) Appl. No.: 13/278,772

(22) Filed: Oct. 21, 2011

(65) Prior Publication Data

US 2012/0102098 A1    Apr. 26, 2012

(30) Foreign Application Priority Data

Oct. 22, 2010 (EP) ..................................... 10306153

(51) Int. Cl.
 *G06F 15/16* (2006.01)
 *G06F 9/50* (2006.01)

(52) U.S. Cl.
 CPC .................................... *G06F 9/5083* (2013.01)

(58) Field of Classification Search
 CPC ..................................................... G06F 9/5083
 USPC ........................................................ 709/203
 See application file for complete search history.

(56) References Cited

U.S. PATENT DOCUMENTS

| | | | |
|---|---|---|---|
| 6,385,636 B1 | 5/2002 | Suzuki | |
| 6,658,657 B1 | 12/2003 | Lueh | |
| 6,996,615 B1 | 2/2006 | McGuire | |
| 8,413,120 B2 | 4/2013 | Emberling | |
| 8,595,289 B2 * | 11/2013 | Nandlall et al. | 709/203 |
| 8,640,108 B2 | 1/2014 | Bellows et al. | |
| 8,789,138 B2 | 7/2014 | Reierson et al. | |
| 8,954,980 B2 | 2/2015 | Stubbs et al. | |
| 2003/0061200 A1 | 3/2003 | Hubert et al. | |
| 2003/0084091 A1 * | 5/2003 | Agarwalla et al. | 709/203 |
| 2003/0084435 A1 * | 5/2003 | Messer et al. | 717/174 |

(Continued)

OTHER PUBLICATIONS

European Search Report and Written Opinion dated Feb. 1, 2011 for corresponding European Application No. 10 306 153.7, filed Oct. 22, 2010.

(Continued)

*Primary Examiner* — Yves Dalencourt
*Assistant Examiner* — Sahera Halim
(74) *Attorney, Agent, or Firm* — David D. Brush; Westman, Champlin & Koehler, P.A.

(57) ABSTRACT

Method for allowing distributed running of an application between a device and a server connected via a network. The method includes the following steps carried out by the device: obtaining a device profile including resource capacity characteristics of the device; obtaining an application profile including resource consumption characteristics of the application; obtaining device metrics relating to real-time resource usage with respect to the device; obtaining offload rules defining conditions under which an application is to be run at least in part on a server and/or on a device, the conditions involving device resource capacity, application resource consumption and device real-time resource usage; and making a decision by an inference engine to run the application at least in part on the server and/or on the device, by evaluating the offload rules applied to the device profile, application profile and device metrics.

15 Claims, 3 Drawing Sheets

(56) References Cited

U.S. PATENT DOCUMENTS

| | | | |
|---|---|---|---|
| 2003/0187998 | A1 | 10/2003 | Petit |
| 2005/0005006 | A1 | 1/2005 | Chauffour et al. |
| 2006/0005193 | A1* | 1/2006 | Illowsky et al. ............. 718/100 |
| 2007/0150599 | A1 | 6/2007 | Neogi et al. |
| 2008/0016508 | A1 | 1/2008 | Goto et al. |
| 2008/0268828 | A1* | 10/2008 | Nagaraja ...................... 455/419 |
| 2009/0248828 | A1* | 10/2009 | Gould et al. .................. 709/207 |
| 2011/0110354 | A1* | 5/2011 | Jiang et al. ................... 370/338 |
| 2011/0167404 | A1 | 7/2011 | Liu et al. |
| 2011/0238496 | A1 | 9/2011 | Gurbuxani et al. |
| 2013/0263247 | A1* | 10/2013 | Jungck et al. ................. 726/13 |

OTHER PUBLICATIONS

European Search Report and Written Opinion dated Feb. 1, 2011 for corresponding European Application No. 10 306 152.9, filed Oct. 22, 2010.

Dong Zhou et al., "Method Partitioning Runtime Customization of Pervasive Programs Without Design-Time Application Knowledge" Proceedings of the 23rd. International Conference on Distributed Computing Systems. ICDCS 2003. Providence, RI, May 19-22, 2003; [International Conference in Distributed Computing Systems], Los Alamitos, Ca: IEEE COMP. Soc. US, vol. CONF. 23, May 19, 2003, pp. 610-619, XP010642332.

Steffen Kern et al., "Towards Adaptive Migration Strategies for Mobile Agents", Jan. 1, 2006, Innovative Concepts for Autonomic and Agent-Based Systems, Lecture Notes in Computer Science; Lecture Notes in Artificial Intelligence; LNCS, Springer, Berlin, DE, pp. 334-345, XP019053523.

Joselli et al.: "Automatic Dynamic Task Distribution between CPU and GPU for Real-Time Systems", 2008 11th IEEE International Conference on Computational Science and Engineering, 2008 IEEE, p. 48-55.

"The Lex & Yacc Page." The LEX & YACC Page. Web. <<http://dinosaur.compilertools.net/#overview>>.

Casse, H., M. Couzinier, and M. Strecker. "Introduction a Lex Et Yacc." (2004/2005): Web. <<http://www.irit.fr/~Martin.Strecker/Teaching/2004/M1_S8_IUP_ISI_Traduction/intro_lex_yacc.pdf>>.

Nahrstedt et al., "QoS-aware resource management for distributed multimedia applications", 1998, IOS Press.

* cited by examiner

METHOD FOR ALLOWING DISTRIBUTED RUNNING OF AN APPLICATION AND RELATED DEVICE AND INFERENCE ENGINE

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to computer software application running or execution.

BACKGROUND OF THE DISCLOSURE

It is common to run an application on a single device. The latter is typically a device owned by a user who requests running of the application.

Some devices however, such as some mobile devices or others, may have limited resources, either permanently or occasionally.

As a non-limiting example, it appears that sometimes such devices are overloaded in terms of processing resource (e.g. CPU) and/or memory (e.g. RAM). This resource overload momentum may happen for instance when too many applications are running at the same time on the same device. Then, even if applications are built with dedicated compilers, the device operating system (OS) may not be able to cope with this overload. This could require to suspend/resume some of the applications based on system scheduler priorities. By doing so, the application quality of service (QoS) is impacted, in particular as far as the amount of time the application needs to provide a specific service is concerned.

SUMMARY

In order to improve this situation, an exemplary embodiment of the disclosure relates to a method for allowing distributed running of an application between a device and a server connected via a network. The method comprises the following steps carried out by the device:
  obtaining a device profile including resource capacity characteristics of said device;
  obtaining an application profile including resource consumption characteristics of said application;
  obtaining device metrics relating to real-time resource usage with respect to said device;
  obtaining offload rules defining conditions under which an application is to be run at least in part on a server and/or on a device, the conditions involving device resource capacity, application resource consumption and device real-time resource usage;
  making a decision by means of an inference engine to run said application at least in part on said server and/or on said device, by evaluating (i.e. checking) the offload rules applied to said device profile, application profile and device metrics.

By doing so, an embodiment of the disclosure can take benefit of the resources of the remote server in addition to the resources of the device itself.

The possibility of dynamic distribution of the application running adds more flexibility to the prior art situation mentioned above.

This flexibility is made even higher due to the fact that, for decision making, it is taken account of:
  resource capacity characteristics of said device via the device profile, so that the decision made is adapted to the type of the device; this is advantageous compared to a fixed and unique decision algorithm, because the latter may be adapted e.g. for features phones which have enough CPU, power and storage space to run high-demanded services like gaming, but not to low-end devices where resources are limited in terms of CPU, memory and battery capacity, or vice-versa;
  resource consumption characteristics of the application via the application profile, so that the decision made is adapted to the type of the application; this is advantageous compared to a fixed and unique decision algorithm, because different applications may need more or less CPU, power, network bandwidth and storage space for example; and
  device metrics relating to real-time resource usage with respect to the device, so that the decision made is adapted to the real-time situation of the device in terms of resource usage; this is advantageous compared to a fixed and unique decision algorithm, because even for a given device type, the CPU, power and storage usage of a device may vary in time such that the device may be capable of running an application alone at a given time, but not at a later time while other applications are already running in the background for example.

A benefit for the device user is to have a better QoS (in particular a better response time) when the device is in an overload state for example. A benefit for the network operator is to extend at some levels the low-end device capabilities in order to provide to its customers value-added services, which are more designed to run on features phones.

The use of an inference engine allows the above-mentioned flexibility. It also facilitates implementation compared to a fixed decision algorithm, as it can tolerate updates, modifications and additions in any of the offload rules, device profile and application profile. For example, when a new application is developed and downloaded by the device, a corresponding application profile can also be downloaded and used immediately in the decision making process. The inference engine adapts itself to this new situation, without the need to change a decision algorithm substantially. In another scenario, the offload rules may be modified, for example due to a subscription upgrade by the device user, without the need for a substantial and visible operation to be performed on the device.

According to advantageous further aspects of the disclosure that may be combined in any possible manner:
  the application profile is built by a pre-processing unit arranged for performing analysis of a code of said application; the analysis can comprise a semantic analysis or other kind of code analysis;
  the application profile is received responsive to the device requesting downloading of said application; in this way, the device does not have to store profiles for applications it does not need;
  the device is provided with the offload rules by an operator of the network; in this way, the operator controls the occupation of the server and device and may easily update the offload rules;

the offload rules depend on a type of subscription a user of the device has with the network; in this way, better performance can be offered to device users having high-level subscriptions;

the device is provided with the device profile by a manufacturer of the device; the manufacturer knows well the device characteristics and can thus build the device profile;

device resource capacity, application resource consumption and/or device real-time resource usage relate to at least one of the following resource: processing resource, random access memory, storage memory, power and network bandwidth; other resource type may also be envisaged instead or in addition;

the method further comprises, when the decision made by the inference engine is to run at least part of said application on the server, offloading said application part to the server;

offloading said application part to the server is performed by taking into account on which conditions defined by the offload rules the decision to run said application part on the server was made by the inference engine; in this way, offloading may take different forms depending on the cause that provoked it.

An embodiment of the disclosure also proposes a device for allowing distributed running of an application between the device itself and a server connected to the device via a network. The device comprises:

a unit for obtaining a device profile including resource capacity characteristics of said device;

a unit for obtaining an application profile including resource consumption characteristics of said application;

a unit for obtaining device metrics relating to real-time resource usage with respect to said device;

a unit for obtaining offload rules defining conditions under which an application is to be run at least in part on a server and/or on a device, the conditions involving device resource capacity, application resource consumption and device real-time resource usage;

an inference engine for making a decision to run said application at least in part on said server and/or on said device, by evaluating the offload rules applied to said device profile, application profile and device metrics.

An embodiment of the disclosure also proposes an inference engine for use in cooperation with a device arranged for allowing distributed running of an application between the device itself and a server connected to the device via a network and comprising a unit for obtaining a device profile including resource capacity characteristics of said device, a unit for obtaining an application profile including resource consumption characteristics of said application, a unit for obtaining device metrics relating to real-time resource usage with respect to said device, and a unit for obtaining offload rules defining conditions under which an application is to be run at least in part on a server and/or on a device, the conditions involving device resource capacity, application resource consumption and device real-time resource usage. The inference engine is arranged for making a decision to run said application at least in part on said server and/or on said device, by evaluating the offload rules applied to said device profile, application profile and device metrics.

The features of the above aspects which are indicated by the dependent claims may be combined as appropriate, and may be combined with any of the above aspects of the disclosure, as would be apparent to a person skilled in the art.

DETAILED DESCRIPTION OF ILLUSTRATIVE EMBODIMENTS

Figure 1:
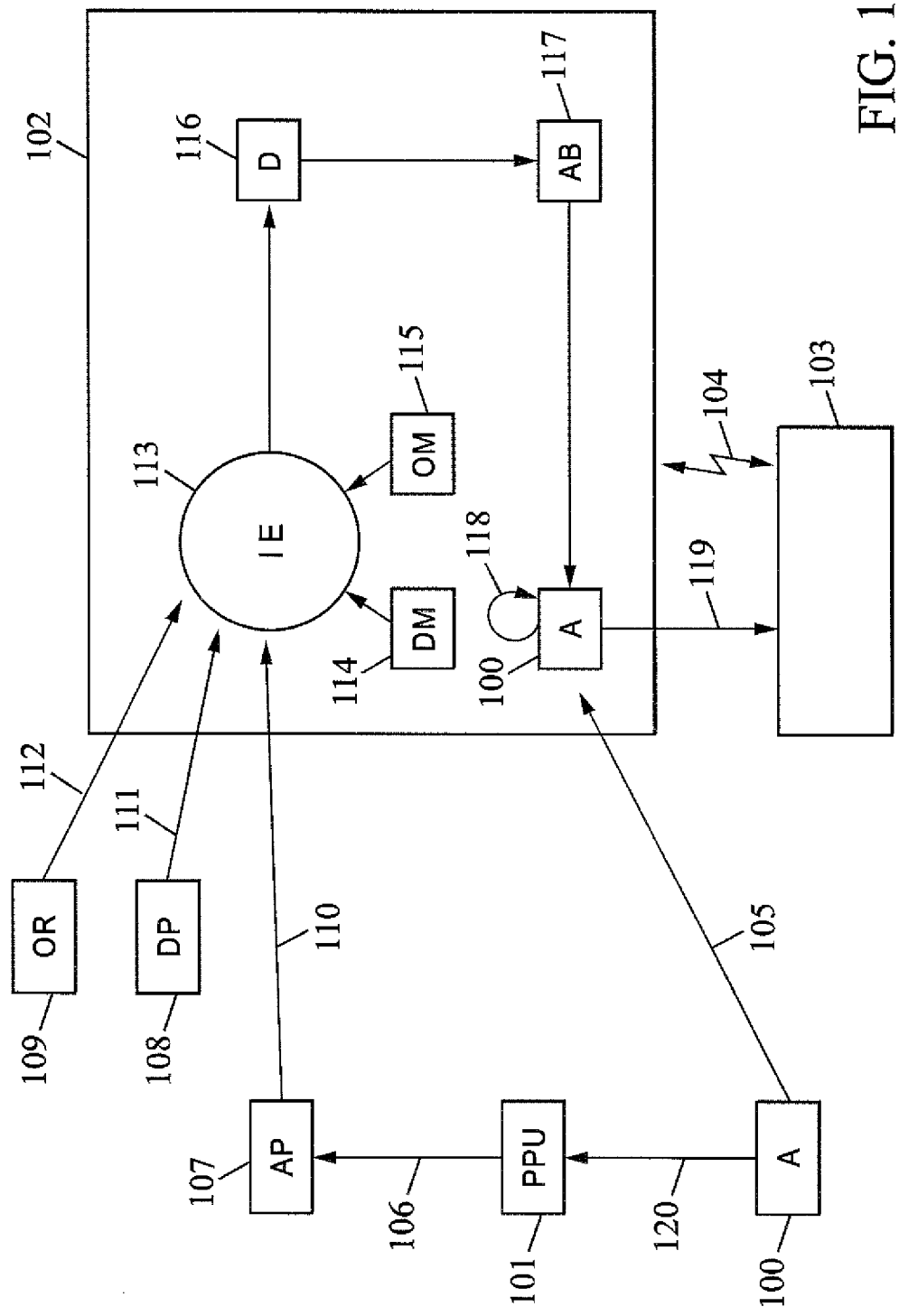
FIG. 1 is a block diagram showing steps carried out according to an exemplary embodiment of the disclosure.

FIG. 1 shows a device 102 which can be any type of communication device, such as a laptop, a desktop, a mobile phone, a smartphone, a personal digital assistant, a tablet computer, etc.

FIG. 1 also shows a server 103 which can be any type of device or system including computing means, such as a computer, a set of interconnected computers (cloud computing), etc. The server 103 may act as a server with respect to the client device 102 if application offloading is to take place finally as will be discussed later. But the use of the functional term "server" does not limit the physical nature of the server 103, which can be of the same type as the device 102 or of a different type. Advantageously, the server 103 offers more resource than the device 102 in terms of any one of: processing resource, random access memory, storage memory, power and network bandwidth.

The device 102 and the server 103 are connected to each other via a network 104, which can take any possible form, such as a fixed network (e.g. PSTN), a cellular network (e.g. GSM, UMTS, LTE), another type of radiocommunication network (e.g. Wifi), an IP network, a combination of any one of the preceding networks, etc. This supposes that the device 102 and the server 103 have appropriate means to communicate with each other in a way that is suitable with respect to the network 104, as is conventional.

At some point in time, the device 102 or its user may wish to run an application A 100 that will provide a respective service. But before that (and even irrespective of whether the device 102 will ever run the application), a pre-processing unit PPU 101 may work on the application code as follows.

The pre-processing unit PPU 101 can consist in any type of device or system. It may also be part of a more complex device or system. As a non-limiting example, the pre-processing unit may be a software or hardware module in a computer.

The pre-processing unit PPU 101 holds a code of the above-mentioned application A 100, containing all the instructions to carry out the application when run on a device. This application code is for example the source code of said application. In this case, any suitable computer language may be used for the source code (C, C++, Java, etc.). Several source codes in different languages may even be used by the pre-processing unit PPU 101 for the same application. Alternatively, the application code may be the binary code of said application, or other. The application code may be stored on the pre-processing unit PPU 101 directly, or the latter may receive it from any other device or system storing the application code (reference 120), such as an application store platform.

In step 106, the pre-processing unit PPU 101 generates from the application code an application profile AP 107 including resource consumption characteristics of the application A 100. This generation 106 can be performed through analysis of the application code. The analysis can for example include a semantic analysis of the source code language, e.g. by means of the Lex & Yacc analyzer or any other appropriate analyzer. In this case, one pre-processing unit may be needed for each programming language such as Java, C, C++, others. For example, the amount of RAM needed could be guessed from the memory allocation functions (ex in C: malloc( )), specific scalar data types (ex: pointer or table variables).

Lex & Yacc is a set of tools which help to manipulate grammars (ex: in our case, a grammar is a programming language: C, C++, Java, others). It is used to develop compilers and interpreters based on a lexical ("Lex": stands for "Lexical Analyzer Generator") and a grammar ("Yacc": stands for "Yet Another Compiler-Compiler").

A compiler or interpreter for a programming language is often decomposed into two parts:

Read the source program and discover its structure;
Process this structure, e.g. to generate the target program.

Lex & Yacc can generate program fragments that solve the first task. The task of discovering the source structure again is decomposed into subtasks:

Split the source file into tokens ("Lex");
Find the hierarchical structure of the program ("Yacc").

More detail on Lex & Yacc can be found for example at the following Web page addresses: http://dinosaur.compilertools.net/#overview and http://www.irit.fr/~Martin.Strecker/Teaching/2004/M1_S8_IUP_ISI_Traduction/intro_lex_yacc.pdf.

The software coupling level could be guessed from the procedure call locations: we can identify procedure or functions which are more/less coupled together, then more or less able to be offloaded on the network. By doing so, the inference engine that will be discussed later may not offload code parts with a high level software couple as it would generate network traffics and thus delays in the service execution.

So, the application A 100 (as well as any other application) can have its own resource consumption characteristics represented in a respective application profile AP 107. Note that the application profile AP 107 may be built in any other possible ways, which do not necessarily involve the pre-processing unit PPU 101. For example, the application profile AP 107 may be provided by the developer of the application and possibly attached to the application code.

The application profile AP 107 may be implemented with a specific language compatible with the inference engine that will be discussed later (Ex: LISP, Prolog, a description language like XML, or other).

The resource consumption characteristics included in the application profile AP 107 may relate to any one of the following resource: processing resource (e.g. CPU), random access memory (RAM), power (e.g. a battery level), storage memory (e.g. HDD, SD-card) and network bandwidth, or any combination thereof, etc.

As non-limiting examples of resource consumption characteristics, the application profile AP 107 may depict the application A 100 in terms of any of: Minimum amount of Mops (million operations per second)/Mips (Million instructions per second) needed to run the application with a good QoS, Amount of RAM used, Amount of storage used, etc.

Those resource consumption characteristics may be expressed with respect to a specific device type, such as the device 102. For instance, the application A 100 could be assumed to consume 20% of the total RAM capacity of the device 102 if run on that device. Alternatively, the resource consumption characteristics may be expressed with respect to a generic device with generic or unspecified resource characteristics (i.e. with no consideration of the device(s) on will the application A 100 may be run in the future).

As different applications will generally not have the same resource consumption characteristics, the inference engine will have different decision making from one application to another as will appear more clearly in the further description of the inference engine.

At some point in time, the device 102 obtains the application profile AP 107. It may for example be received from the pre-processing unit PPU 101 (reference 110). Alternatively, it may receive it from any other device or system, such as an application store platform. Advantageously, the application profile AP 107 may be received responsive to the device 102 requesting downloading of said application. In this way, the device 102 does not unnecessarily store application profiles for applications it will never dowload. In this case, the application profile AP 107 may be received together with the application code itself (e.g. in a software package). Any other way for obtaining the application profile AP 107 may be implemented instead or in addition, as will appear to one skilled in the art.

The device 102 also obtains a device profile DP 108 including resource capacity characteristics of said device 102 (reference 111).

The device profile DP 108 may be implemented with a specific language compatible with the inference engine that will be discussed later (Ex: LISP, Prolog, a description language like XML, or other).

The resource capacity characteristics included in the device profile DP 108 may relate to any one of the following resource of the device 102: processing resource (e.g. CPU), random access memory (RAM), power (e.g. a battery level), storage memory (e.g. HDD, SD-card) and network bandwidth, or any combination thereof, etc.

As non-limiting examples, the device profile DP 108 may depict the resource capacity characteristics of the device 102 in terms of any of: CPU power capacity in Mips or Mops, total RAM amount, local storage capacity, network type available (from which a network bandwidth may be derived), battery capacity (in hours/min), etc.

As devices of different types will generally not have the same resource capacity characteristics, the inference engine will have different decision making from one device to another as will appear more clearly in the further description of the inference engine.

The device 102 may obtain the device profile DP 108 in any possible way. For example, it may be provided by the manufacturer of the device 102, by storing it in a memory at the time of manufacturing the device 102, by further downloading, or other.

The device 102 also obtains device metrics DM 114 relating to real-time resource usage with respect to the device 102. Those metrics may be obtained in any suitable way, for example from measurements carried out at least in part by the device 102 itself. They may checked on a regular basis or at specific times (e.g. when the inference engine must make an offload decision). Note that the device metrics DM 114 may relate to real-time resource availability rather than usage, which is strictly equivalent.

Like for the resource consumption and resource capacity characteristics mentioned above, the real-time resource usage included in the device metrics DM 114 may relate to any one of the following resource: processing resource (e.g. CPU), random access memory (RAM), power (e.g. a battery level), storage memory (e.g. HDD, SD-card) and network bandwidth, or any combination thereof, etc.

For example, the device metrics DM 114 may include any of: the current CPU load (or the free CPU) on the device 102, the RAM used (or available) on the device 102, the local occupied (or free) storage space on the device 102, the current used (or available) network bandwidth with respect to the device 102, etc.

Other metrics OM 115 may be used in addition to the device metrics DM 114, so as to enrich the decision making. Some example of such metrics may include: location awareness, current available signal strength received by the device 102 from the network 104, current offload delay, etc.

Finally, the device 102 obtains offload rules OR 109 (reference 112). Those offload rules define conditions under which an application is to be run at least in part on a server (i.e. remotely) and/or on a device (i.e. locally), the conditions involving at least device resource capacity, application resource consumption and device real-time resource usage.

A non-limiting example of offload rules is given below for illustrative purpose. One skilled in the art will understand than any other set of offload rules may be used instead or in addition to the following.

In this offload rules example, the parameters relating to device resource capacity are indicated in bold characters, the parameters relating to application resource consumption are indicated in underlined characters, and the parameters relating to device real-time resource usage are indicated with dashed underlined characters. Some categories appear in comments using italic characters:

---

// Basic information
- Offload delay (s) = amount of code to offload from the application(i) (Kbytes) / current network rate (Kbytes/s)
- MAX_DELAY = 30s
- Others
  // Reasons to activate the offload mechanism for one particular service / application based on the application and device profiles matching (it identifies potential applications which could generate a device overload)
  - If (CPU needed for the application(i) >= 50% CPU capacity) => cpu_offload = true.
  - If (RAM needed for the application(i) >= 50% RAM capacity) => ram_offload = true.
  - If (Storage space used for the application(i) >= 10% local storage capacity) => storage_offload = true.
  // Reasons to activate the offload mechanism for one particular service / application based on the device metrics (real time used or available resources)
  - If (CPU load >= 80% CPU capacity) => cpu_offload = true.
  - If (RAM used >= 80% RAM capacity) => ram_offload = true.
  - If (local storage used > 80% local storage capacity) => storage_offload = true.
  - If (cpu_offload = true) OR (ram_offload = true) OR (storage_offload = true) => activate offload = true.
  - Others
  // Reasons not to activate the offload mechanism for one particular service / application because of network, battery or other constraints
  - If (activate_offload = true) AND (offload delay > MAX_DELAY (s)) => activate_offload = false.
  - If (activate_offload = true) AND (network signal strength <= xx (dB)) => activate_offload = false.
  - If (activate_offload = true) AND (network bandwidth. <= yy (MHz)) => activate_offload = false.
  - If (activate_offload = true) AND (network rate <= zz (Kbytes/s)) => activate_offload = false.
  - If (activate_offload = true) AND (battery level <= 20%) => activate_offload = false.
  - Others

---

Note that in this offload rules example, several boolean variables (cpu_offload, ram_offload, storage_offload) are used in relation with respective causes for an offload (insufficient CPU, RAM or storage).

Note also that all the conditions defined in the above offload rules example are listed in a determined order, but this order may not be respected when checking whether some or all those conditions are satisfied with respect to a given device and a given application.

The device 102 may obtain the offload rules OR 109 in any possible way. As an example, it may be provided with the offload rules by an operator of the network 104. The operator can thus control distribution of application running between devices and servers.

The offload rules OR 109 may be the same for every application and every device or they may depend on certain factors. For example, they may depend on a type of subscription a user of the device 102 has with the network. In this way, a premium subscriber may benefit from a remote running capacity greater than a normal subscriber for instance. Other scenarios and factors may be envisaged for the offload rules OR 109, as will appear to one skilled in the art. As an example, the offload rules OR 109 may vary in time, for example to allow the network operator to adapt occupation of the server 103 to the amount of requests received from devices, the number of applications downloaded, etc.

As shown in FIG. 1, the device 102 further comprises an inference engine IE 113. The latter can take any possible form, such as a software and/or hardware component in the device 102. The inference engine IE 113 is in charge of making a decision as to whether an application must be run completely locally on the device 102, completely on the remote server 103 (offload), or partly on the device 102 and partly on the server 103 (partial offload).

The decision is made by the inference engine IE 113 by evaluating the offload rules OR 109 applied to the device profile DP 108, the application profile AP 107 and the device metrics DM 114, as well as possible other characteristics such as the other metrics OM 115.

To do so, the inference engine IE 113 gets the device profile DP 108, the application profile AP 107 and the device metrics DM 114 obtained by the device 2. This can be done on a regular basis or when the application A 100 is run or about to be run, for example upon request by the device user. Note that not all the offload rules OR 109 may be evaluated at the same time: all or part of the offload rules independent of the device metrics DM 114 may be evaluated in advance (e.g. as soon as the application A 100 is deployed on the device 102), while all or part of the offload rules depending on the device metrics DM 114 may be evaluated when the application A 100 is be run or has started running on the device 102. Different time frames may also be envisaged, as will appear to one skilled in the art.

For example, with regard to the above mentioned non-limiting example of offload rules OR 109, the inference engine IE 113 may replace all or part of the parameters relating to device resource capacity, application resource consumption and device real-time resource usage by the corresponding values included in the device profile DP 108, application profile AP 107 and the device metrics DM 114 respectively.

In normal mode where the application A 100 can be correctly run with the CPU, RAM, storage and/or other resources available on the device 2, the inference engine would not find any offload actions to do.

The conclusion would be different however in an overloaded context. Let us assume for example that the resource asked by the application A 100 cannot be fulfilled from the device resources currently available. This could happen e.g. when the device resources are completely used and cannot be free at all (ex: local storage is full) or some device resources are used in their maximum capacity for a limit amount of time (ex: a gaming application is using 90% of the CPU during few seconds). From the device metrics, the inference engine IE 113 will automatically generate the right offload action to be done, because of this resource gap. It could be either e.g. a storage offload (i.e. an offload due to insufficient storage available) because the local storage is full, or a RAM or CPU offload (i.e. an offload due to insufficient CPU or RAM available) because the RAM or CPU remaining capacity is low (ex: too much background process). Offloading at least part of the application A 100 to the server 103 may thus be performed by taking into account on which conditions defined by the offload rules OR 109 (storage, CPU, RAM, etc.) the decision to run said application part on the server 103 was made by the inference engine IE 113.

To make a decision, the inference engine IE 113 may advantageously be based on a forward chaining approach. In such approach, data get put into working memory. This triggers rules whose conditions match the new data. These rules then perform their actions. The actions may add new data to memory, thus triggering more rules. And so on. This is also called data-directed inference, because inference is triggered by the arrival of new data in working memory. As far as the inference engine IE 113 is concerned, the decisions may thus be made based on facts from the device metrics DM 114.

The device profile DP 108, the application profile AP 107, the offload rules OR 109 and the device metrics DM 114 should preferably be consistent enough in order to generate consistent decisions from the inference engine IE 113. Decision making should advantageously be compatible with the overload context of mobile devices.

The inference engine IE 113 may use data-driven decision making. The inference engine control is thus based on the frequent re-evaluation of the data states (device metrics <-> offload rules), not on any static control structure of the program (which is the case of a fixed hard coded decision tree algorithm). The sequence of steps taken to make a decision is dynamically synthesized with each new case (ex: from real-time device metrics).

The inference engine IE 113 may process multiple values for any problem parameter. This permits more than one line of reasoning to be pursued (vs. the classic fixed hard coded approach where only one branch could be pursued at a time).

It is not explicitly programmed when the system is built. The computation is often qualified as data-driven or pattern-directed in contrast to the more traditional procedural control. Rules can communicate with one another only by way of the data, whereas in traditional programming languages, procedures and functions explicitly call one another. Unlike instructions (ex: hard coded decision tree), rules are not executed sequentially and it is not always possible to determine through inspection of a set of rules which rule will be executed first or cause the inference engine to terminate.

In contrast to a procedural computation, in which knowledge about the problem domain is mixed in with instructions about the flow of control (ex: hard coded decision tree), the inference engine model allows a more complete separation of the knowledge (in the rules) from the control (the inference engine).

The way the inference engine IE 113 evaluates the set of rules (here the offload rules OR 109) introduces more flexibility in the way to generate offload decisions. This means that from one application to another and from one device to another, we will not have the same offload decisions as they are data-driven (or pattern driven). This data are represented by the application and device profiles.

Thus, using the inference engine IE 113 for the offload decision making will be driven by the device and application profiles and not by a classic procedure control (ex: a hard coded decision tree). This is introducing flexibility for the offload decision making, based on the device and application characteristics (represented by the device and application profiles).

The inference system approach is interesting as the decision making can be described in terms of boolean rules located in files. This is easier to maintain as rules could be changed from the files instead of directly change the decision algorithm source code and then compile it—which is not a good solution for a market deployment. It is also a more generic approach in order to adapt the decision algorithm to other factors or new metrics introduced in the system.

Figure 2:
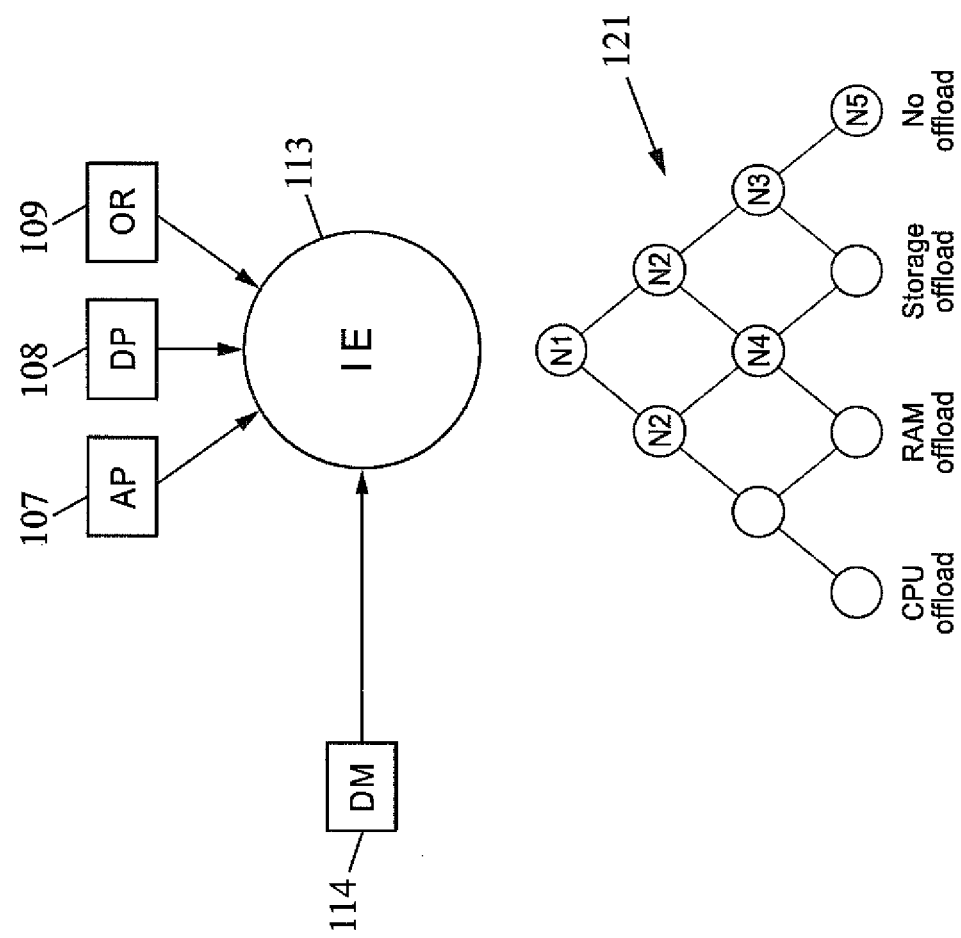
FIG. 2 is a schematic view of data-driven decision making performed by means of an inference engine according to an exemplary embodiment of the disclosure.
Figure 3:
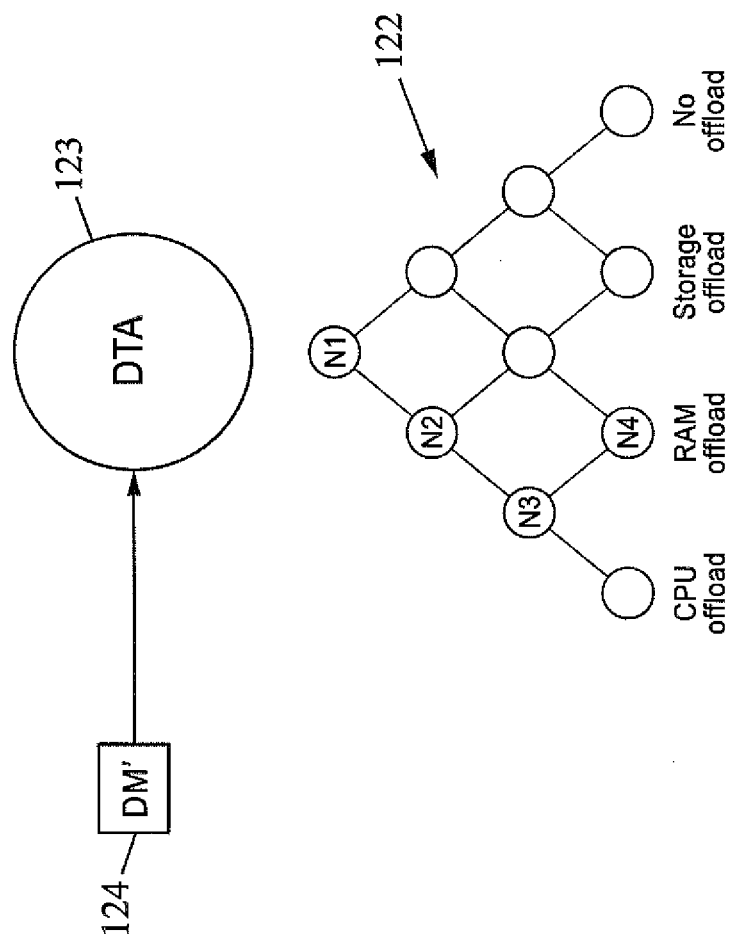
FIG. 3 is a schematic view procedural-control decision making performed by means of a traditional fixed hard-coded decision tree algorithm.

FIGS. 2 and 3 show how such decision making mechanisms (data-driven vs. procedural-control) could lead to different decisions.

FIG. 2 relates to data-driven decision making performed by means of the above mentioned inference engine IE 113 based at least on the device profile DP 108, the application profile AP 107, the offload rules OR 109 and the device metrics DM 114.

The data-driven decision making is illustrated with reference 121, in which the empty circles relate to inactivated rules among the offload rules OR 109, while the circles filled with Ni reference relate to rules activated at the $i^{th}$ iteration among the offload rules OR 109 (here with i being an integer between 1 and 5). All the offload rules OR 109 are re-evaluated at each iteration of the inference engine IE 113.

As shown in the example of FIG. 2, multiple "branches" can be evaluated in parallel (see e.g. N2).

In this example, the device metrics DM 114 provided to the inference engine IE 113 lead to the "No offload" decision.

In contrast, FIG. 3 relates to procedural-control decision making performed by means of hard-coded decision tree algorithm DTA 123 based on device metrics DM' 124, with respect to a given device and a given application.

This implementation may rely on a sequential evaluation of offload rules (N1, N2, N3, N4 are on different levels of the tree 122). Thus, the rule order impacts the decision results.

Also, only one rule can be "activated" at a time and only one "branch" can be followed at a time.

In the example of FIG. 3, a "RAM offload" decision is made, in contrast with the "No offload" decision of FIG. 2.

So, even if both decision mechanisms relate to the same device type and to the same application, the way the decision is implemented may lead to completely different offload decisions.

Offload decisions made according to procedural-control process are much less flexible compared to the data-driven decision shown in FIG. 2.

The procedural-control way of implementing a decision making system could fit to a specific device type and for a specific application type (high demand CPU applications, high demand RAM applications, etc.). But, it could not adapt itself to other kinds of device types and application types. For example, if such a system is deployed on a completely different device type (low-end device instead of a smartphone) with different application types (high demand CPU applications such as gaming), the decisions generated will be completely inappropriate compared to the context.

In the other hand, a data-driven decision system such as the one of FIG. 2 can lead to appropriate offload decisions in all circumstances and adapt itself to the device and application characteristics with the help of the profiles.

For illustration purpose, non-limiting examples of offload decisions that can be made by the inference engine IE 113 will be described hereafter.

According to a first example, it is assumed that the device profile DP 108 indicates a CPU capacity of 2 Mops for the device 102 and that the application profile AP 107 indicates that the application A 100 has a CPU need of 4 Mops. This scenario corresponds to a request for running a high-demand CPU application on a low-end device.

When the application A 100 needs to be run or at any previous point in time (e.g. when the application A 100 is deployed on the device 102), the inference engine 113 identifies it as a potential high-demand application in terms of CPU. With respect to the above mentioned example of offload rules OR 109, this can be achieved by considering that the offload criterion "CPU needed for the application(i)>=50% CPU capacity" is satisfied.

When the application A 100 is about to be run or has started running on the device 102, the inference engine 113 detects that the CPU load is very high because for example of other applications which are running in the background at the same time. This can be achieved based on the above mentioned offload criterion "CPU load>=80% CPU capacity".

Then offload due to CPU overload can be activated (as the boolean variable cpu_offload is assigned the value 'true') and the current network characteristics are checked with respect to the device 102 (from the device metrics DM 114) in order to know if it is worth doing the application offload later or now. This can be achieved for example by checking whether the above mentioned criteria "offload delay>MAX_DELAY (s)" is satisfied or not.

According to a second example, it is assumed that the device profile DP 108 indicates a CPU capacity of 10 Mops for the device 102 and that the application profile AP 107 indicates that the application A 100 has a CPU need of 4 Mops. This scenario corresponds to a request for running a high-demand CPU application on a smartphone for example.

In this scenario, the application A 100 is not identified as a potential high-demand service in terms of CPU ("CPU needed for the application(i)>=50% CPU capacity" is false). And when the application is about to run or is running on the device 102, the CPU load may remain at an acceptable level ("CPU load>=80% CPU capacity" is false).

In this case, there will be no offload activation as the CPU load level is OK compared to the smartphone capabilities.

According to a third example, it is assumed that the device profile DP 108 indicates a RAM capacity of 1 Mbyte.

On the other hand, many applications are running on the device 102 in the background.

In this scenario, the inference engine IE 113 identifies no application as a potential high-demand application. But, more than one lightweight application is running in the background, which affects considerably the device capability to cope with all these applications in parallel. From the device metrics DM 114, one rule is becoming "true" from the set of offload rules OR 109, namely "RAM used>=80% RAM capacity". This is enough to activate the RAM offloading process for one or several of the applications which are running.

The RAM offload will also depend on the network capacity to do it currently ("offload delay>MAX_DELAY (s)" criterion).

Back to FIG. 1, once the inference engine IE 113 has made a decision D 116 to run the application A 100 at least partially on the server 103 (offload) or completely on the device 102, this decision D 116 may be sent to an application broker AB 117, which is advantageously embedded in the device 102 e.g. as a hardware and/or software component.

The application broker AB 117 is in charge of applying the decision D 116 from the inference engine IE 113 to the target application A 100 which is running or about to run on the device 102.

So the application broker AB 117 ensures that, depending on the decision D 116 made by the inference engine IE 113, the application A 100 is run fully on the device 102 (reference 118), offloaded fully to the server 103 via the network 104 (reference 119), or run partly on the device 118 and partly on the server 103.

The mechanism used for offloading at least part of the application A 100 to the server 103 so that the latter runs it can take any possibly form. As non-limiting examples, it may make use of at least one of the conventional following techniques: Device Virtualization layer, the OS itself, Remote Procedure Call (RPC), Object serialization, etc. Depending on the selected mechanism, only short calls or substantial application code parts may be transmitted from the device 102 to the server 103.

If, as mentioned earlier, the decision D 116 depends on a specific condition defined in the offload rules OR 109 (i.e. on a specific cause for the offload), such as RAM offload, CPU offload or Storage offload, the application broker AB 117 may take that into account for offloading.

In this way, the offload typology may imply different offload mechanisms.

For example if the application A 100 must be offloaded on the server 103 in order to free CPU load on the device 102, the offload process should preferably be transparent for the user and should preferably not impact the other applications running on the same device.

Several solutions could be used in order to implement the application broker component AB 117. For example:

The OS application scheduler could be updated from the OS kernel source code in order to be able to offload the application A 100 running on the device, to the specific server 103—in a transparent manner for the user of the device 102. The application lifecycle will be impacted and could have a least one added state which would be "Offloaded". Such application state means that it will run on the server-side as long as the device 102 is in overloaded context. The application will be restored on the device 102 as soon as there are enough resources to run it locally.

Device virtualization techniques: it adds another software layer between the hardware and the OS on mobile devices in order to be able to "virtualize" any device resources (ex: RAM, storage, CPU, others). By doing that, device resources could be extended on-demand in a seamless manner (no application impacts, no user experience impacts).

Whatever the solution chosen for the application broker component AB 117 (updated OS, device virtualization or other solutions), the server side should be able to run devices applications, whatever the OS may be. Several OS emulators (ex: Android, Symbian, others) may be needed on the server 103 in order to run device applications in the same context as locally on the device.

Note that all the functions described so far may be carried out in various ways. They may be carried out by different units or entities, possibly in a different manner from the one described above, as one skilled in the art will realize. As an example, the functions performed by the pre-processing unit PPU 101, the inference engine IE 113, the application broker component AB 117 may be carried out by entities embedded in other devices or systems as the ones mentioned above, or even distributed between several devices or systems.

All or part of the functions described so far may also be carried out by means of computer programs including appropriate code instructions as will appear to one skilled in the art. These computer programs can be stored on non-transitory computer-readable media, for example, and when executed by a computer perform one or more of the method steps described herein.

Although the present disclosure has been described with reference to one or more examples, workers skilled in the art will recognize that changes may be made in form and detail without departing from the scope of the disclosure and/or the appended claims.

We claim:

1. A method for allowing distributed running of an application between a device and a server connected via a network, the method comprising the following steps carried out by the device:

obtaining, by said device, a device profile including resource capacity characteristics of said device;

obtaining, by said device, an application profile including resource consumption characteristics of said application before said application is run;

obtaining, by said device, device metrics relating to real-time resource usage with respect to said device;

obtaining, by said device, offload rules defining conditions under which said application is to be run at least in part on said server and/or on said device, the conditions involving device resource capacity, application resource consumption and device real-time resource usage;

making a decision, by an inference engine of said device, to run said application completely locally on said device, completely remotely on said server or partially on said device and partially on said server, by evaluating the offload rules applied to said device profile, application profile and device metrics; and controlling distribution of the application running between the device and the server based on said decision.

2. The method as claimed in claim 1, wherein the application profile is obtained from a pre-processing unit arranged for performing analysis of a code of said application.

3. The method as claimed in claim 1, wherein the application profile is received responsive to the device requesting downloading of said application.

4. The method as in claim 1, wherein the device is provided with the offload rules by an operator of the network.

5. The method as claimed in claim 4, wherein the offload rules depend on a type of subscription a user of the device has with the network.

6. The method as claimed in claim 1, wherein the device is provided with the device profile by a manufacturer of the device.

7. The method as claimed in claim 1, wherein device resource capacity, application resource consumption and/or device real-time resource usage relate to at least one of the following resources: processing resource, random access memory, storage memory, power or network bandwidth.

8. The method as claimed in claim 1, further comprising, when the decision made by the inference engine is to run the at least part of said application on the server, offloading said application part to the server.

9. The method as claimed in claim 8, further comprising a plurality of different forms of offloading, wherein each of the different forms of offloading corresponds to a different one of the conditions defined by the offload rules or corresponds to a different combination of multiple ones of the conditions defined by the offload rules, and wherein offloading the at least part of said application to the server is performed by one of the different forms of offloading that corresponds to one or more of the conditions, defined by the offload rules, that provoked the inference engine to make the decision to run the at least part of said application on the server.

10. The method as claimed in claim 1, wherein the resource consumption characteristics included in the application profile are generated at least in part by analyzing a source code language of said application.

11. The method as claimed in claim 10, wherein analyzing the source code language of said application comprises performing a semantic analysis of the source code language of said application.

12. The method as claimed in claim 1, wherein the application profile is built prior to execution of the application on at least one of the device or the server.

13. A device for allowing distributed running of an application between the device and a server connected via a network, the device comprising:

an inference engine configured to:
  receive a device profile including resource capacity characteristics of said device;
  receive an application profile including resource consumption characteristics of said application;
  receive device metrics relating to real-time resource usage with respect to said device;
  receive offload rules defining conditions under which said application is to be run at least in part on said server and/or on said device, the conditions involving device resource capacity, application resource consumption and device real-time resource usage, wherein the offload rules depend on a type of subscription a user of the device has with the network;
  make a decision to run said application at least in part on said server and/or on said device, by evaluating the offload rules applied to said device profile, application profile and device metrics; and
  control distribution of the application running between the device and the server based on said decision.

14. The device of claim 13, wherein the type of subscription that the user of the device has with the network comprises one of a plurality of subscription types, wherein each of the plurality of subscription types has a different remote running capacity for running said application.

15. A non-transitory computer-readable medium, storing instructions of an inference engine to implement a method for allowing distributed running of an application between a device and a server connected via a network, when the instructions are executed by a computer, wherein the method comprises:
  obtaining a device profile including resource capacity characteristics of said device;
  obtaining an application profile including resource consumption characteristics of said application before said application is run;
  obtaining device metrics relating to real-time resource usage with respect to said device;
  for obtaining offload rules defining conditions under which said application is to be run at least in part on said server and/or on said device, the conditions involving device resource capacity, application resource consumption and device real-time resource usage;
  making a decision to run said application completely locally on said device, completely remotely on said server or partially on said device and partially on said server, by evaluating the offload rules applied to said device profile, application profile and device metrics; and
  controlling distribution of the application running between the device and the server based on said decision.

\* \* \* \* \*